United States Patent [19]

Miller

[11] Patent Number: 4,802,723

[45] Date of Patent: Feb. 7, 1989

[54] OPTICAL FIBER TAP

[75] Inventor: Calvin M. Miller, Lilburn, Ga.

[73] Assignee: American Telephone and Telegraph Company, AT&T Bell Laboratories, Murry Hill, N.J.

[21] Appl. No.: 416,363

[22] Filed: Sep. 9, 1982

[51] Int. Cl.⁴ .............................................. G02B 6/36
[52] U.S. Cl. .................................................. 350/96.15
[58] Field of Search ................ 350/96.15, 96.16, 96.20

[56] References Cited

U.S. PATENT DOCUMENTS

| | | | |
|---|---|---|---|
| 3,931,518 | 1/1976 | Miller | 250/227 |
| 3,936,631 | 2/1976 | Muska | 250/227 |
| 3,982,123 | 9/1976 | Goell et al. | 250/227 |
| 4,076,375 | 2/1978 | Muska et al. | 350/96.15 |
| 4,135,780 | 1/1979 | Dyott | 350/96.15 |
| 4,253,727 | 3/1981 | Jeunhomme et al. | 350/96.15 |
| 4,270,839 | 6/1981 | Cross | 350/96.15 |
| 4,301,543 | 11/1981 | Palmer | 455/612 |
| 4,302,071 | 11/1981 | Winzer | 350/96.20 |
| 4,302,072 | 11/1981 | Vucins | 350/96.21 |
| 4,312,562 | 1/1982 | Segawa et al. | 350/96.15 |
| 4,330,170 | 5/1982 | Johnson et al. | 350/96.16 |
| 4,335,933 | 6/1982 | Palmer | 350/96.19 |

FOREIGN PATENT DOCUMENTS

| | | |
|---|---|---|
| 50847 | 5/1978 | Japan . |
| 78145 | 6/1979 | Japan . |
| 145154 | 8/1979 | Japan . |

OTHER PUBLICATIONS

"Optical-Fibre Tap with Low Insertion Loss," F. R. Gfeller et al, *Electronics Letters*, vol. 15, No. 15, Jul. 19, 1979, pp. 448–450.
*Optical Fibre Communication*, by Technical Staff of CSELT, pp. 587–591 and 640.
"An Engineering Guide to Couplers," J. C. Williams et al, *Laser Focus with Fiberoptic Technology*, Oct. 1981, pp. 129–132, and 134.
"Optical Directional Coupler Using Tapered Directions in Multimode Fibers," T. Ozeki et al, *Applied Physics Letters*, vol. 28, No. 9, May 1, 1976, pp. 528–529.
"Fused Conically Tapered Fibre-Optical Power Divider," E. G. Rawson et al, *Electronics Letters*, vol. 18, No. 11, May 27, 1982, pp. 447–448.
U.S. patent application, Ser. No. 367,120, filed Apr. 19, 1982, "Low Loss Optical Fiber Splicing," G. F. DeVeau, Jr. et al.

*Primary Examiner*—William L. Sikes
*Assistant Examiner*—Akm E. Ullah
*Attorney, Agent, or Firm*—James H. Fox

[57] ABSTRACT

Light guided by an optical fiber is tapped by bending the fiber, and substantially surrounding a portion of the fiber with a tube that couples a portion of the optical energy to a detector. The tube can be bent to increase the efficiency of collection of optical energy. The tube can be tapered to improve coupling to small detectors. The loss introduced by the tap is typically in the range of 0.001 to 1.0 dB, and the collection efficiency is high. The technique can be used for single mode or multimode optical fibers, and the fiber can typically remain coated. A large number of taps, typically several hundred, can be applied or removed without disrupting a signal carried by an optical fiber.

14 Claims, 4 Drawing Sheets

OPTICAL FIBER TAP

BACKGROUND OF THE INVENTION

1. Field of the Invention

This invention relates to a device and method for tapping optical energy from an optical fiber.

2. Description of the Prior Art

Optical fibers are used increasingly for transmitting data and other communications in a wide variety of situations. Both single mode and multimode fibers are used for relatively long-distance communications between telephone central offices or other installations at distances of several kilometers. In addition, optical fibers are being used for relatively shorter distance communications, such as connecting campus-type office complexes, connecting computers and computer terminals, or connecting components in an electronic switching system for telephone and other telecommunication purposes. It is expected that in automated office systems, various terminals, including printers, display screens, etc., will be connected by means of optical fibers. Some of the envisioned applications—for example, tapping television or other video signals or tapping high-speed data transmission from an optical fiber—require that a tap be able to handle wide bandwidth signals or high data rates. In other cases, the bandwidth is not so significant as the ability to conveniently insert or remove a tap. It is especially desirable to be able to tap an optical fiber without breaking the fiber and without removing the coating. Furthermore, it is desirable to be able to change the amount of signal tapped from the fiber, for use with devices having different sensitivities, or to compensate for the fiber attenuation of optical energy as a function of distance from the source. Finally, it is desirable that a tap introduce minimal loss to the optical energy propagating through the fiber.

Some previously reported optical fiber taps require one or more connectors in an optical fiber system. That technique typically necessitates breaking the fiber to make a tap. In addition, the system is disrupted in some cases when a tap is connected or removed. Connector losses of 0.2 to 2.0 dB are typically inherent in these designs, limiting the number of taps that can be connected in a fiber distribution system. In one case, optical energy scattered from the end of a fiber was collected; see "Optical-Fibre Tap With Low Insertion Loss," F. R. Gfeller et al, *Electronics Letters,* Vol. 15, pages 448-450 (1979).

In other optical fiber taps, breaking a fiber or attaching a connector is not necessary, with the optical energy being removed by coupling power to modes that radiate out of the fiber to a detector; see, for example, U.S. Pat. Nos. 3,931,518, 3,936,631, and 3,982,123, coassigned with the present invention. The generic technique disclosed and claimed therein is to radiate light out of the core of the fiber into the cladding, as by bending the fiber. The light is then coupled out of the fiber cladding by a dielectric body, and detected by means of a detector. While the embodiments shown in the abovenoted patents are useful in many situations, there is a need for further improvement for many applications.

SUMMARY OF THE INVENTION

I have invented a method and device for tapping optical energy from an optical fiber. In this invention, a tube of transparent material, typically glass or plastic, is placed around a portion of the fiber. The fiber is bent, either at an end of the tube or within the tube. In typical embodiments, the tube is slotted for ease of insertion and removal of the fiber or formed in two or more sections that are placed around the fiber. The fiber is continuous; that is, not broken within the tube, and the fiber can typically remain coated. The tube need not be in proximity to an end of the fiber. A detector is optically coupled to an end of the tube for detecting tapped optical energy propagating axially along the tube. The tube outer diameter can be made small, 1 millimeter or less, to be compatible with the active area of a wide bandwidth detector. For fibers having optical energy propagating in both directions, two detectors can be optically coupled to the opposite ends of the tube, with a degree of isolation being obtained between the two detected optical signals. In a first embodiment, the fiber is bent at the point of exit of the fiber from the end of the tube opposite the end coupled to the corresponding detector. In a second embodiment, the tube and fiber therein are bent. Both single mode and multimode optical fibers can be tapped by this technique.

DETAILED DESCRIPTION

The following detailed description relates to a technique for tapping optical energy from an optical fiber. This technique is due in part to the discovery that substantially surrounding a portion of the fiber with a transparent tube is a very efficient means of extracting optical energy from an optical fiber; that is, the amount of tapped energy is relatively high compared to the attenuation of optical energy propagating in the fiber due to the tap. In addition, the fiber is continuous within the tube in the present technique, unlike certain prior art techniques requiring a break in the fiber to tap optical energy. The unbroken fiber of the present technique helps provide for a relatively low insertion loss for the tap. It also allows for readily inserting or removing a tap without disrupting the optical fiber signal. As used herein, a portion of optical fiber is considered to be "substantially surrounded" by a tube if at least 50% of the circumference of the fiber portion is encompassed by the tube. As discussed below, the tube can be slotted, or in sections, to allow ease of insertion and removal of the fiber.

Unlike certain prior art devices, the present tap does not rely on collecting light scattered from an end of a fiber. Therefore, the term "not in proximity to an end of the fiber", as used herein in reference to the tap, means that the transparent tube is sufficiently far from an end of a continuous section of the fiber so that less than 50% of the tapped energy coupled to the detector is due to scattering from an end. I estimate that a tap at least 1 meter from an end typically meets this condition. For this purpose, a break in a fiber at a splice point or connector point is considered to be an end of the fiber.

Figure 1:
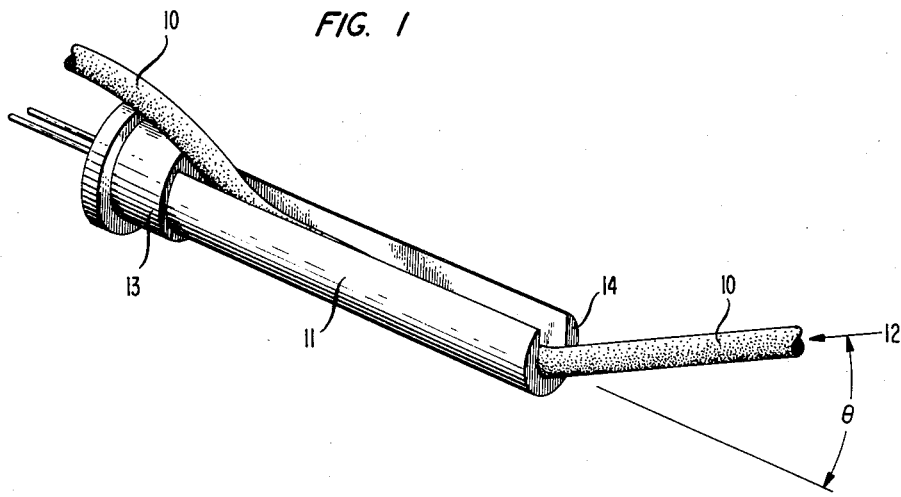
FIG. 1 shows a straight tube optical fiber tap.

Referring to FIG. 1, in a first embodiment, an optical fiber 10 is placed inside a straight tube 11. The fiber is bent as it exits end 14 of the tube opposite the end coupled to detector 13. The bend angle $\theta$ is typically greater than 10 degrees, and has a radius of curvature of typically less than 1 millimeter. Optical energy 12 is directed into the fiber, and a portion of the energy propagating in the core of the fiber is induced by the bend to propagate in the cladding of fiber 10. The energy is coupled from the cladding, or a coating thereon if a coating is present, into tube 11, and detected by detector 13. Since the bend in the fiber is external to the tube, this first embodiment is referred to as a "straight tube tap". For convenience, tube 11 has a slot running axially along its length for ease of insertion and removal of the fiber. Thus, the tap can be conveniently relocated without damage to the fiber. In another embodiment, the tube 11 can be formed in two half sections and placed around the fiber, and still other arrangements for substantially surrounding the fiber with the tube can be envisioned.

Figure 2:
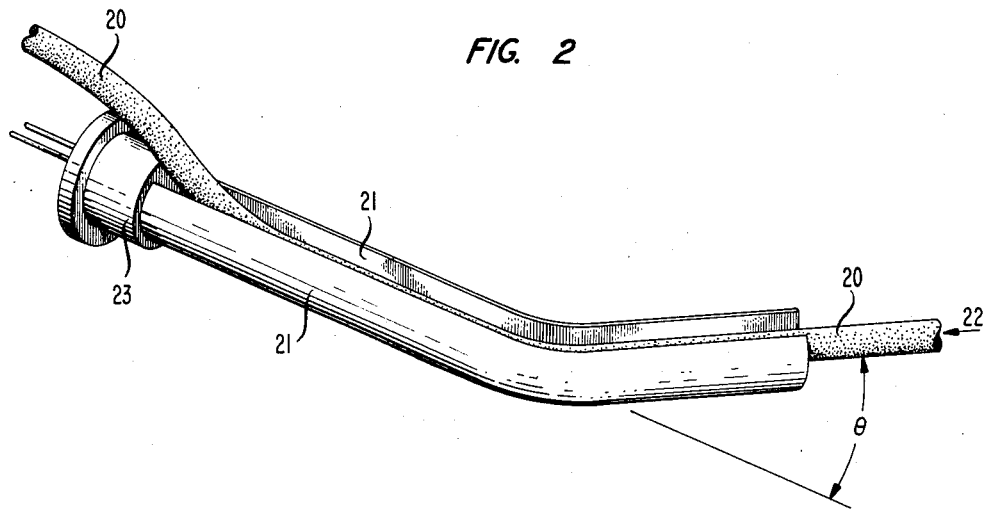
FIG. 2 shows a bent tube optical fiber tap.

It has further been found that bending the optical fiber within the tube substantially increases the amount of tapped energy coupled from the fiber, often without a proportional increase in insertion loss due to the tap. That is, the efficiency of the tap, defined as the ratio of the tapped power to the insertion loss (see Equation 4 below), is typically improved by bending both the tube and fiber therein. This second embodiment is referred to as a "bent tube tap". As shown in FIG. 2 $\theta$ is the angle of the bend of the tube and fiber portion therein. The bend angle $\theta$ is again typically greater than 10 degrees, but the radius of curvature of the bend need not be small. By varying the angle $\theta$, differing amounts of energy can be tapped. This is a very useful property when placing multiple taps along an optical fiber. The taps furthest away from the source will inherently receive less energy due to fiber attenuation, and hence a higher value of $\theta$ can be used to tap the same amount of energy as the taps nearer the optical source.

Figure 3:
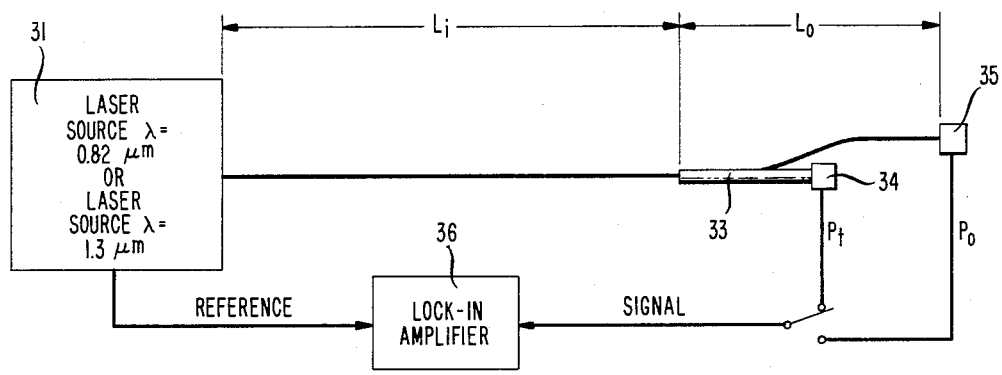
FIG. 3 shows the measuring technique for measuring the tapped signal and attenuation due to the tap.

Both straight tube and bent tube taps were characterized with a multimode fiber at a wavelength of 0.82 micrometers and also with a single mode fiber at a wavelength of 1.3 micrometers. The measuring setup is shown in FIG. 3. The source 31 was a laser at a wavelength of 0.82 micrometers for the multimode fiber or 1.3 micrometers for the single mode fiber. A length of fiber $L_i$ was placed before the tap in order to determine the effect of fiber length on tap characteristics. The tap itself comprised tube 33, which was either straight or bent, with the tapped energy being detected by an InGaAs PIN diode 34. In addition, the optical energy transmitted through the fiber was detected by a comparable PIN diode 35. The length of the fiber between the tap and the output diode 35 is designated $L_0$. For long (i.e., 1 km or greater) lengths of fiber, the fiber was wound around a drum about 20 centimeters in diameter (not shown). The detected signals from the two diodes were measured using a lock-in amplifier 36 and a reference signal from the source. In this manner, both the transmitted signal and the tapped signal could be measured.

The tube used for the splice was a silica glass tube approximately 8 centimeters long. It had an inside diameter of 0.3 millimeters and an outside diameter of 0.9 millimeters. A slot, approximately 0.3 millimeters wide, was cut into the tube axially along its length. To obtain a bent tube configuration, the tube was heated in an oxyhydrogen torch, and one end was allowed to sag an appropriate amount. The fibers were inserted in the tubes, and the tubes were filled with an index-matching fluid. The use of an index-matching fluid is not necessary in many cases but increases the amount of detected signal.

In all the experiments noted herein, the opical fiber had an outer (cladding) diameter of about 125 micrometers, and remained coated with an ultraviolet-cured epoxy acrylate coating approximately 50 micrometers thick. The coating had an index of refraction of about 1.51, while the cladding of the fiber had an index of refraction of about 1.47. It is typical in the art for a coating to have a higher index of refraction than the cladding to "strip" higher order modes out of the cladding. This index relationship increases the efficiency of the present tap, as compared to coatings having a lower index of refraction than the cladding. While the coating can be removed for still higher sensitivity, this is not necessary in most cases. Thus, the tap can be readily applied to, or removed from, a portion of the fiber without substantially degrading the strength of the fiber. It is expected that other coating materials—for example, silicones or thermoplastic hot melt resins either in single or multiple layer coatings—can also be left on a typical fiber while obtaining a satisfactory tapped signal.

The insertion loss of the tap, $\alpha_t$, is $$\alpha_t = 10 \log(P_{01}/P_{02})(\text{dB}) \quad (1)$$

where
 $P_{01}$ = output power measured by detector 35 with no tap;
 $P_{02}$ = output power measured by detector 35 with tap applied.

The tapped signal $S_t$ is referenced to the input power to the tap. When the tap is applied to the output end of a long fiber.

$$S_t = 10 \log(P_t/P_{01})(\text{dB}) \quad (2)$$

where $P_t$ is the tapped power measured by detector 34.

When the tap is applied to the input end of a long fiber, $$S_t = 10 \log (P_t/P_{01}) + 10 \log(P_{01}/P_i)(\text{dB}) \quad (3)$$

where $P_i$ = input power to the fiber, and the second term is the fiber loss.

Tapping efficiency $\eta$ is defined $$\eta = 100 \, P_t/(P_{01} - P_{02})(\%) \quad (4)$$

or $$\eta = \frac{10^{0.1 S_t + 2}}{1 - 10^{-0.1 \alpha_t}} (\%) \quad (5)$$

Single Mode Tap Results

Figure 4:
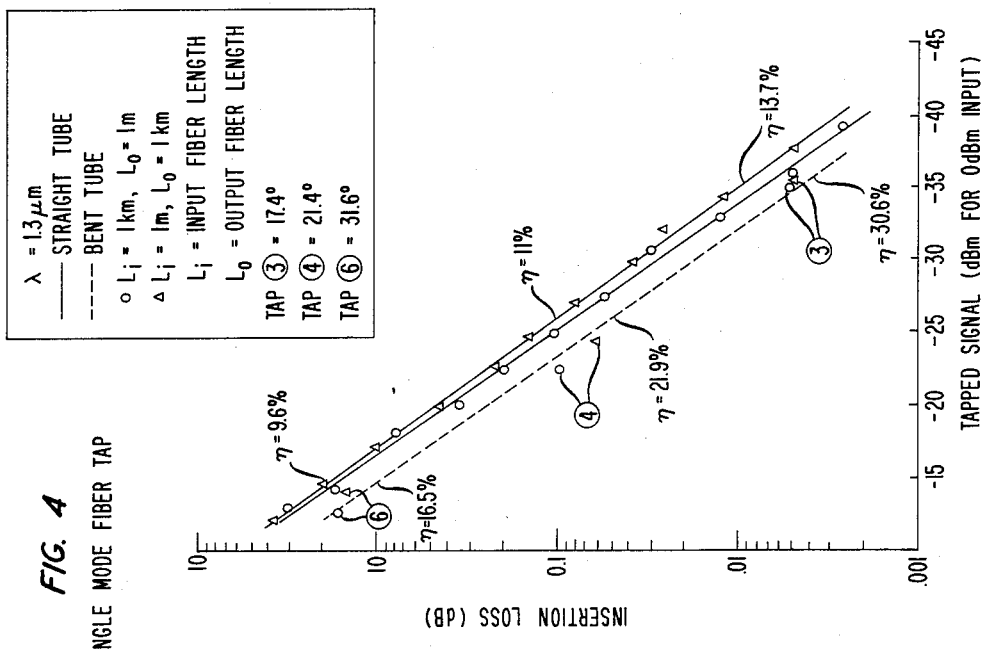
FIG. 4 shows insertion loss versus the tapped signal for single mode fiber taps.

Insertion loss versus tapped signal for straight tube and bent tube taps applied to a single mode fiber is shown in FIG. 4. Solid and dashed lines are best fit regression lines of the form $S_t = a + b \ln (\alpha_t)$, and efficiencies are marked at various points along each of these lines. Correlation coefficients for regression lines are greater than 0.99. Bent tube taps are seen to have slightly higher efficiencies than straight tube taps and have similar characteristics whether placed at the input or output end of the fiber. Insertion losses for a tapped signal of −40 dBm (assuming 0 dBm input) are approximately 0.002 dB/tap, allowing 500 taps/dB of loss. As signal attenuation occurs due to fiber loss or taps, increased tapping ratio (more bending) is required to supply an adequate receiver level.

Multimode Tap Results

Figure 5:
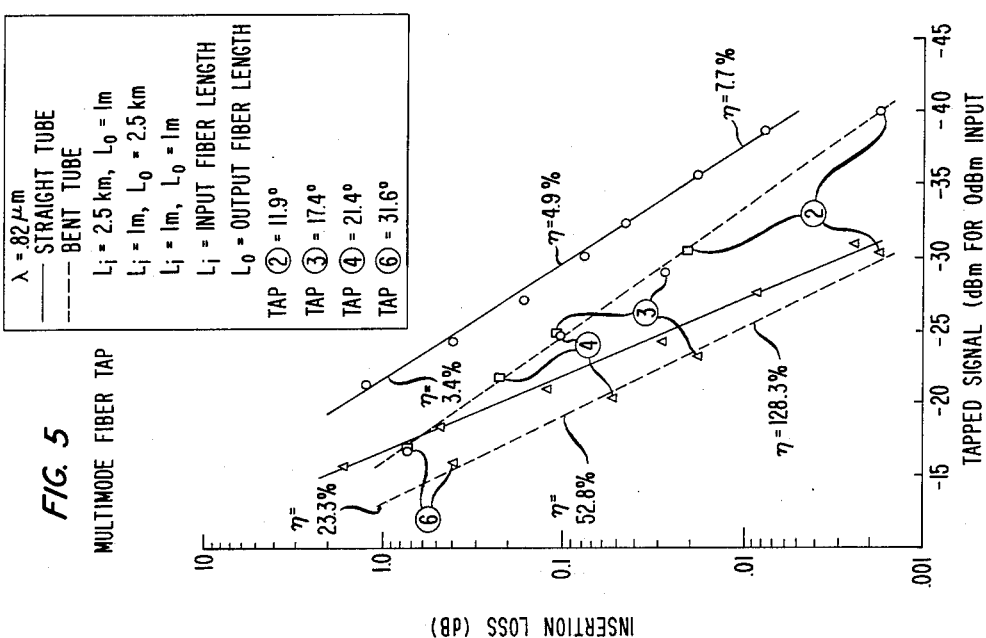
FIG. 5 shows insertion loss versus the tapped signal for multimode fiber taps.

Results for multimode fiber at $\lambda = 0.82$ μm are shown in FIG. 5. Bent tube taps (dashed lines) have significantly higher efficiencies than straight tube taps (solid lines), and near the input of a long fiber, efficiencies for both bent and straight tube taps can be greater than 100%. This is due to tapping leaky and lossy modes that contribute to tapped power $P_t$ but are lost along the fiber length and do not contribute to $P_{01}$. Tap 2 (11.9 degrees) gains an additional 10 dB of tapped signal due to this effect which decreases with increased bending to only 1 dB for tap 6 (31 degrees). Insertion loss for tap 2 appears to be unchanged whether at the input or output of a long fiber; however, a substantial error bar can exist for all measurements below 0.01 dB. Tap 6 causes a loss decrease of 0.35 dB at the input of a long fiber compared to insertion loss at the output of a long fiber, probably due to filtering out the higher-order modes at the input and causing a slightly lower fiber attenuation (0.14 dB/km). The simple expression for tap attenuation $\alpha_t$ assumes that fiber attenuation remains constant.

As with single mode fibers, insertion loss for −40 dBm tapped signal is 0.002 dB/tap, allowing 500 taps/dB of loss for a near steady state modal power distribution (long input fiber). Correlation coefficients for best fit regression lines are greater than 0.99.

The very low insertion loss and relatively high tapping efficiency evidenced by the above experiments allow greatly increased flexibility in designing information transmission systems. The high efficiency of coupling of scattered energy from the fiber to the detector by means of the tube typically allows the use of only one bend. This not only simplifies implementation, but minimizes added loss in the fiber. The high efficiency of coupling is due in part to the fact that the tube collects a relatively high percentage of the power from modes that are made to radiate in the bend but remain parallel or close to parallel to the axis of the fiber. In addition, the detector is positioned to efficiently intercept these modes as they propagate along the tube. Furthermore, the present technique allows the surface area of the coupling medium to be relatively large, for high efficiency, while keeping the cross-sectional area small, allowing efficient coupling to typical high-speed photodetectors, which have relatively small active surface areas.

Figure 6:
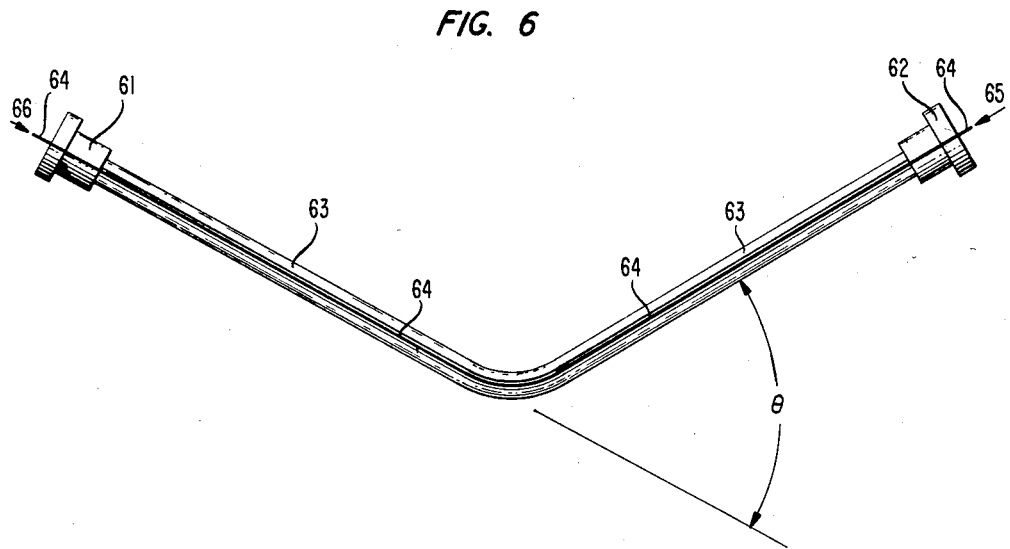
FIG. 6 shows a bidirectional tap employing two detectors.

The present optical fiber tap can be employed in a bidirectional configuration, as shown in FIG. 6. In this configuration, detectors 61 and 62 are placed at opposite ends of tube 63 surrounding a portion of optical fiber 64. The portion of the tube comprising the fiber is bent by angle $\theta$ to provide for increased sensitivity, as noted above. In the configuration of FIG. 6, detector 61 responds primarily to radiation 65 directed as shown through optical fiber 64. Detector 62 is most sensitive to radiation 66 propagating in the other direction along the fiber. A degree of isolation is thus obtained between the two detectors. This allows, for example, for tapping two different optical signals propagating in opposite directions along the fiber. In some cases, the isolation afforded by this technique allows the two propagating signals to be of the same wavelength. In other cases, additional isolation between the signals is desirable and may be obtained, for example, by using differing wavelengths for signals 65 and 66.

While the above example has used a glass tube, other transparent materials can also be used. For example, typical plastics have n index of refraction in the range of about 1.3 to 1.6 and are suitable in this regard for use with either silica glass or plastic optical fibers. As noted above, the use of an index-matching fluid or gel within the tube is desirable but not necessary in most cases. The medium immediately surrounding the tube should not substantially absorb optical energy at the operating wavelength of the fiber. This can be accomplished by surrounding the tube with a material having a lower index of refraction than the tube. In the case of air surrounding the tube, which has an index of refraction of about 1, this is inherently obtained with typical glass or plastic tubes. However, other embodiments of the tube design may have other media surrounding the tube. For example, the tube may comprise two half sections surrounded by a plastic or other supporting means, with the two half sections being clamped or otherwise secured around a fiber. The index of refraction of the transparent tube used for tapping the optical energy from the fiber should then be higher than that of the surrounding material. Alternately, the outer surface of the tube can be made reflective at the operation wavelength by coating with a suitable material, such as silver, aluminum, etc.

Figure 7:
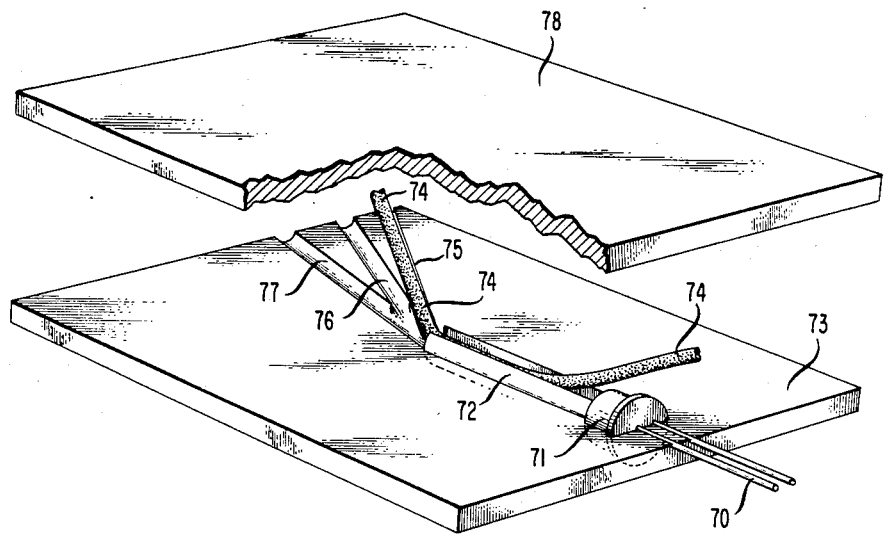
FIG. 7 and 8 show convenient packaging of the inventive taps.
Figure 8:
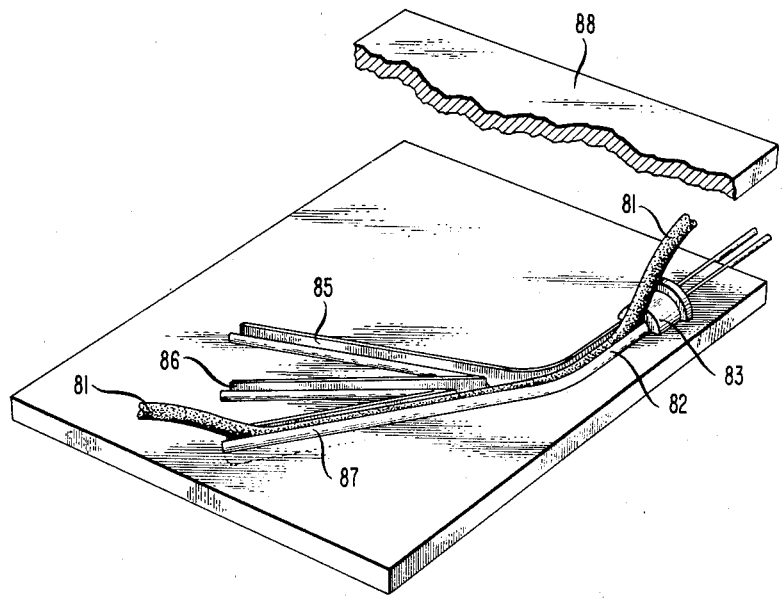

To vary the amount of tapped energy, the amount of bending of the fiber can be changed. In the case of the straight tube tap, this is conveniently accomplished as shown in FIG. 7. The detector 71 is located at an end of tube 72 in housing 73. The degree of bending of fiber 74, and hence the amount of tapped signal, is changed by changing in which of the grooves 75–77 the fiber is located after it exits the tube. The position of the fiber is secured by clamping or otherwise fastening top piece 78 onto the housing 73. In the case of the bent tube tap, as shown in FIG. 8, the degree of bending of the fiber 81 in the tube 82 can be changed by means of grooves, 85–87, as shown. The tube shown is slotted to allow easy insertion and removal of the fiber, which is again secured by placing top piece 88 onto body 83.

A further advantage of the present technique relates to very high-speed (i.e., wide bandwidth) signals carried on an optical fiber, wherein it is necessary to detect the tapped energy with a very high-speed detection means—for example, a very fast PIN or avalanche diode. The cross-sectional areas of such devices are inherently very small to obtain reduced capacitance, reduced transit time, etc., for fast response. As noted above, the cross-sectional area on the tube can be small. Furthermore, the end portion of the tube leading to the detector can be tapered, as by drawing a heated tube to reduce the diameter, so that the light energy is more efficiently coupled to the active area of the detector. Thus, the present device can enjoy the benefits of a large collection area for high tapping efficiency while still maintaining good coupling efficiency to a fast response detector.

The tube used in the tap need not be rigid, but can be made of flexible material; for example, a relatively low modulus silicone or other transparent polymer material. This allows bending of the tube to change the proportion of signal tapped. It can also allow tapping efficiency to be improved without the use of an index-matching fluid or gel, as by applying pressure to the flexible tube so that it conforms to the outer diameter of the optical fiber.

All such variations and deviations through which the present invention has advanced the art are considered to be within the spirit and scope of the present invention.

What is claimed is:

1. A device for tapping energy from an optical fiber CHARACTERIZED in that said device comprises a tube of transparent material adapted to substantially surround a continuous portion of an optical fiber and having a bend therein adapted to form a bend in said fiber, and with a first detector being optically coupled to a first end of said tube so as to detect optical energy propagating axially along a first direction of said tube.

2. The device of claim 1 wherein a second detector is optically coupled to a second end of said tube so as to detect optical energy propagating axially along a second direction of said tube.

3. The device of claim 1 wherein said tube has a slot located axially therein suitable for the insertion or removal of an optical fiber therein.

4. The device of claim 1 wherein said tube comprises two half sections adapted to being placed around said fiber.

5. The device of claim 1 wherein at least said first end of said tube is tapered to a smaller diameter than the portion of said tube adapted to substantially surround said fiber in order to improve coupling to said first detector.

6. The device of claim 1 wherein said bend in said fiber subtends an angle ($\theta$) of greater than 10 degrees.

7. The device of claim 6 wherein said bend in said fiber has a radius of curvature of less than one millimeter.

8. An optical communications system that includes at least one device for tapping energy from an optical fiber CHARACTERIZED in that said device comprises a tube of transparent material adapted to substantially surround a continuous portion of an optical fiber and having a bend therein adapted to form a bend in said fiber, and with a first detector being optically coupled to a first end of said tube so as to detect optical energy propagating axially along a first direction of said tube.

9. The system of claim 8 wherein a second detector is optically coupled to a second end of said tube so as to detect optical energy propagating axially along a second direction of said tube.

10. The system of claim 8 wherein said tube has a slot located axially therein suitable for the insertion or removal of an optical fiber therien.

11. The system of claim 8 wherein said tube comprises two half sections adapted to being placed around said fiber.

12. The system of claim 8 wherein at least said first end of said tube is tapered to a smaller diameter than the portion of said tube adapted to substantially surround said fiber in order to improve coupling to said first detector.

13. The system of claim 8 wherein said bend in said fiber subtends an angle ($\theta$) of greater than 10 degrees.

14. The system of claim 8 wherein said bend in said fiber has a radius of curvature of less than one millimeter.

* * * * *